US012574059B2

(12) United States Patent
Farhadi et al.

(10) Patent No.: US 12,574,059 B2
(45) Date of Patent: Mar. 10, 2026

(54) DETERMINING PRECODING PARAMETERS

(71) Applicant: TELEFONAKTIEBOLAGET LM ERICSSON (PUBL), Stockholm (SE)

(72) Inventors: Hamed Farhadi, Stockholm (SE); Mårten Sundberg, Årsta (SE); David Sandberg, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 40 days.

(21) Appl. No.: 18/711,369

(22) PCT Filed: Sep. 17, 2021

(86) PCT No.: PCT/SE2021/050896
§ 371 (c)(1),
(2) Date: May 17, 2024

(87) PCT Pub. No.: WO2023/043347
PCT Pub. Date: Mar. 23, 2023

(65) Prior Publication Data
US 2025/0038776 A1 Jan. 30, 2025

(51) Int. Cl.
| | |
|---|---|
| *H04B 1/04* | (2006.01) |
| *H04B 17/16* | (2015.01) |
| *H04B 17/336* | (2015.01) |

(52) U.S. Cl.
CPC ........... *H04B 1/0475* (2013.01); *H04B 17/16* (2015.01); *H04B 17/336* (2015.01)

(58) Field of Classification Search
CPC .... H04B 1/0475; H04B 17/16; H04B 17/336; H04B 7/04; H04L 27/368

USPC ......................................... 375/267, 285, 296
See application file for complete search history.

(56) References Cited

U.S. PATENT DOCUMENTS

| | | | | |
|---|---|---|---|---|
| 2012/0069927 A1* | 3/2012 | Oyman | .................. | H04L 1/0019 |
| | | | | 375/285 |
| 2012/0077466 A1* | 3/2012 | O'Mahony | .......... | H04N 21/631 |
| | | | | 455/566 |
| 2015/0023279 A1* | 1/2015 | Tomeba | .............. | H04L 27/3455 |
| | | | | 370/329 |
| 2015/0372740 A1* | 12/2015 | Ko | ........................ | H04B 7/0665 |
| | | | | 370/329 |
| 2018/0219566 A1 | 8/2018 | Weissman et al. | | |
| 2022/0077900 A1* | 3/2022 | Farhadi | ................ | H04B 7/0632 |

OTHER PUBLICATIONS

International Search Report and Written Opinion mailed on Jun. 14, 2022 for International Application No. PCT/SE2021/050896, 10 pages.

(Continued)

*Primary Examiner* — Emmanuel Bayard
(74) *Attorney, Agent, or Firm* — Sage Patent Group

(57) ABSTRACT

Methods and apparatus are provided. In an example aspect, a method in a wireless communication device of precoding symbols for transmission is provided. The method includes determining an indication of distortion of symbols transmitted by transmission apparatus of the wireless communication device or an indication of a correction for the distortion, determining precoding parameters based on the indication of distortion or the indication of the correction, and precoding symbols to be transmitted based on the precoding parameters.

20 Claims, 6 Drawing Sheets

800

(56) References Cited

OTHER PUBLICATIONS

Yao, Miao et al., "A Digital Predistortion Scheme Exploiting Degrees-of-Freedom for Massive MIMO Systems," 2018 IEEE International Conference on Communications (ICC), May 20, 2018, 5 pages.

International Preliminary Report on Patentability mailed on Mar. 5, 2024 for International Application No. PCT/SE2021/050896, 8 pages.

* cited by examiner

100

200

700

800

DETERMINING PRECODING PARAMETERS

CROSS-REFERENCE TO RELATED APPLICATIONS

This application is a 35 U.S.C. § 371 national stage application for International Application No. PCT/SE2021/050896, entitled "DETERMINING PRECODING PARAMETERS," filed on Sep. 17, 2021, the disclosure and content of which is hereby incorporated by reference in its entirety.

TECHNICAL FIELD

Examples of the present disclosure relate to determining precoding parameters, for example for precoding symbols for transmission by a wireless communication device.

BACKGROUND

In wireless communication systems, any imperfections in radio frequency (RF) hardware components such as oscillator phase noise, power amplifier nonlinearity, and I/Q imbalance may contribute to distortions in a transmitted signal. The overall RF impairments may typically be described using distortion measures such as error-vector-magnitude (EVM), Adjacent Channel Leakage Ratio (ACLR) and Intermodulation Distortion (IMD).

In advanced antenna systems (AAS) such as massive multi-user (MU) multiple-input and multiple-output (MIMO), spatial multiplexing is used to improve the overall throughput. While multiple users may enjoy the simultaneous use of all time-frequency resources using beamforming at the transmitter side and filtering at the receiver side, controlling the transmit power of the users based on pathloss and channel quality is crucial to achieve the targeted quality of service. Precoding algorithms have been developed to perform beamforming of the transmitted signals based on acquired channel state information.

SUMMARY

Hardware impairments such as power amplifier (PA) nonlinearities and oscillator phase noise degrades the performance of wireless communication systems such as MIMO systems. The existing state-of-the-art linear precoding algorithms do not take into account the distortion caused by non-ideal hardware at the transmitter side, and the state of RF hardware impairment is subject to variations and is unknown to the transmitter.

One aspect of the present disclosure provides a method in a wireless communication device of precoding symbols for transmission. The method comprises determining an indication of distortion of symbols transmitted by transmission apparatus of the wireless communication device or an indication of a correction for the distortion. The method also comprises determining precoding parameters based on the indication of distortion or the indication of the correction, and precoding symbols to be transmitted based on the precoding parameters.

A further aspect of the present disclosure provides method in a first wireless communication device of determining precoding parameters. The method comprises receiving one or more precoded symbols from a second wireless communication device, and determining an indication of distortion of the precoded symbols by transmission apparatus of the second wireless communication device or an indication of a correction for the distortion. The method also comprises causing the second wireless communication device to determine precoding parameters based on the indication of distortion or the indication of the correction.

An additional aspect of the present disclosure provides apparatus in a wireless communication device for precoding symbols for transmission. The apparatus comprises a processor and a memory. The memory contains instructions executable by the processor such that the apparatus is operable to determine an indication of distortion of symbols transmitted by transmission apparatus of the wireless communication device or an indication of a correction for the distortion, determine precoding parameters based on the indication of distortion or the indication of the correction, and precode symbols to be transmitted based on the precoding parameters.

A still further aspect of the present disclosure provides apparatus in a first wireless communication device for determining precoding parameters. The apparatus comprises a processor and a memory. The memory contains instructions executable by the processor such that the apparatus is operable to receive one or more precoded symbols from a second wireless communication device, determine an indication of distortion of the precoded symbols by transmission apparatus of the second wireless communication device or an indication of a correction for the distortion, and cause the second wireless communication device to determine precoding parameters based on the indication of distortion or the indication of the correction.

Another aspect of the present disclosure provides apparatus in a wireless communication device for precoding symbols for transmission. The apparatus is configured to determine an indication of distortion of symbols transmitted by transmission apparatus of the wireless communication device or an indication of a correction for the distortion, determine precoding parameters based on the indication of distortion or the indication of the correction, and precode symbols to be transmitted based on the precoding parameters.

An additional aspect of the present disclosure provides apparatus in a first wireless communication device for determining precoding parameters. The apparatus is configured to receive one or more precoded symbols from a second wireless communication device, determine an indication of distortion of the precoded symbols by transmission apparatus of the second wireless communication device or an indication of a correction for the distortion, and cause the second wireless communication device to determine precoding parameters based on the indication of distortion or the indication of the correction.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
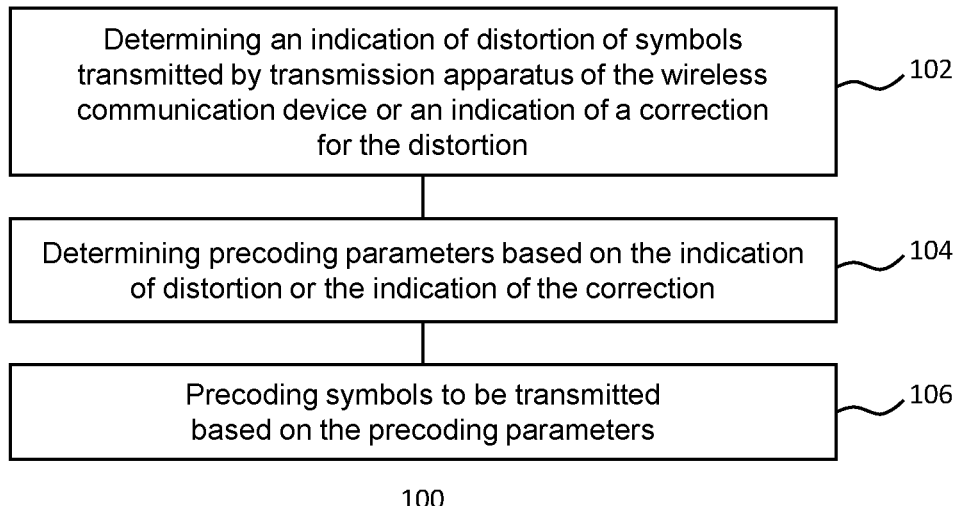
FIG. 1 is a flow chart of an example of a method in a wireless communication device of precoding symbols for transmission.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

In this disclosure, in some examples, methods are proposed to adapt precoders in wireless communication systems and devices to distortion, such as for example that caused by hardware impairments. In some examples, methods use a codebook-based approach to select a precoder or precoding parameters from a pre-designed codebook based on channel state information (CSI) and hardware state information (HSI) for adapting a beamforming precoder. In other examples, methods may use a non-codebook based approach to dynamically adapt a precoder based on CSI and HSI indices and compute a new precoder or precoder parameters to improve a performance metric. The HSI can be computed using a classifier at the transmitter or the receiver.

In some examples, where a primary network (e.g. a cellular network) operates in proximity of a secondary network (e.g. a satellite network) in adjacent frequency band, the interference leakage from primary network towards secondary network due to hardware imperfections (e.g. the leakage of interference from a base station towards the earth station of the satellite network) can be managed to be within an acceptable limit by using embodiments of this disclosure. Additionally or alternatively, for example, where primary users are sharing a frequency band with secondary users, e.g. in cognitive radio networks, interference leakage from secondary users towards primary users due to hardware imperfections can be maintained to be within an acceptable limit by using embodiments of this disclosure.

Examples of this disclosure may apply suitable precoder parameters depending on the state of RF hardware (referred to below as transmission apparatus) and the underlying impairments. For example, when the transmit power is high, and a power amplifier (PA) in the transmission apparatus is operating in non-linear regime, a precoder that is designed to compensate for PA non-linearities can be applied among the ones that can be selected for the given channel state information (CSI). This may be selected for example to maximize signal to noise and distortion ratio (SNDR) or to satisfy a secondary condition, e.g. Adjacent Channel Leakage Power Ratio (ACLR) constraints or to null-form distortion towards specific directions. When the transmit power is reduced, for example due to PA back-off, then a precoder which is designed to compensate for a lower amount of PA nonlinearity can be applied, e.g. to maximize the array gain towards the intended receiver.

In another example, which may apply in place of or addition to those examples described above, when the carrier frequency of transmitted symbols switches to higher frequency and oscillator phase noise increases, a precoder designed to compensate for increased phase noise can be selected, e.g. to maximize SNDR.

In another example, which may apply in place of or addition to those examples described above, when the SNR is low at a receiver, the impact of distortion may be neglected and a precoder may be selected which maximizes the received signal energy. On the other hand, when the SNR is high, then the distortion e.g. from PA non-linearities is dominant, and a precoder that provides a higher level of compensation for distortion may be selected.

In examples of this disclosure, the terms selecting or determining a precoder and selecting or determining precoding parameters may be used interchangeably.

FIG. 1 is a flow chart of an example of a method 100 in a wireless communication device of precoding symbols for transmission. The method comprises, in step 102, determining an indication of distortion of symbols transmitted by transmission apparatus of the wireless communication device or an indication of a correction for the distortion. The distortion may be for example at least one of phase noise, quantization noise and nonlinearity of the transmission apparatus. The indication may in some examples be a new indication or an update of a previous indication. The transmission apparatus may comprise for example one or more radio frequency (RF) transmitter chains.

In some examples, determining the indication may comprise determining the indication based on feedback relating to transmission of other symbols by the transmission apparatus. For example, the feedback may be received from one or more receivers of the other symbols. Alternatively, for example, the feedback may be determined based on a comparison of an input and an output of the transmission apparatus when transmitting the other symbols. In both cases, for example, the difference between what is transmitted and what is intended to be transmitted may provide the feedback. In some examples, the indication may be received from one or more receivers of other symbols transmitted by the transmission apparatus. Therefore, for example, the feedback may be determined within the one or more receivers of the other symbols, and the one or more receivers may then determine the indication and return it to the wireless communication device.

The method 100 also comprises, in step 104, determining precoding parameters based on the indication of distortion or the indication of the correction. The parameters may in some examples be new parameters or an update of one or more previous precoding parameters. The selection of precoding parameters can in some examples be performed at the receiver side (e.g. based on the indication) and fed back by the receiver, e.g. using a codebook based approach. In other examples, selection of the precoding parameters can be performed at the transmitter side (i.e. by the wireless communication device) based on information determined at the wireless communication device (e.g. the indication), and/or using information fed back from the receiver, such as for example HSI and CSI as suggested below.

In some examples, the HSI may describe hardware impairments of (or distortion to a signal or symbols caused by) the transmission apparatus, though in other examples the HSI may be an index to a lookup table that describes such impairments or distortions. The table below provides an example of how certain hardware impairments (in this example, PA nonlinearity and oscillator phase noise power) can be mapped to different values for HSI index. The hardware impairments are in this example classified as low, high or (in the case of PA nonlinearity) medium, and each of these may represent a range of values. So, for example, according to the table below, transmission apparatus that distorts a signal or symbols to be transmitted in such a way to result in high PA nonlinearity and low oscillator phase noise power (which may be determined for example by measuring these values and selecting the ranges in which these values fall) may be given a HSI value of 3. The value of the HSI may be for example the indication that is used to determine precoder parameters. For example, the HSI value of 3 may be used to determine parameters that correct for a high level of PA nonlinearity and a low level of oscillator phase noise power.

| HSI | PA nonlinearity | Oscillator phase noise power |
|-----|-----------------|------------------------------|
| 1 | low | low |
| 2 | medium | low |
| 3 | high | low |
| 4 | low | high |
| 5 | medium | high |
| 6 | high | high |

In some examples, the precoding parameters may be determined based further on other information, such as for example channel state information, CSI, of at least one channel on which the precoded symbols are to be transmitted, and/or based further on a signal to noise ratio, SNR, of signals transmitted using the transmission apparatus. The channel state information (CSI) can in some examples be estimated at the receiver and fed back to the transmitter, or it can be estimated at the transmitter side exploiting channel reciprocity.

The method 100 also comprises, in step 106, precoding symbols to be transmitted based on the precoding parameters. The method 100 may also in some examples comprise providing the precoded symbols to the transmission apparatus for transmission.

As suggested above, examples of this disclosure may use a codebook-based approach to select a precoder or precoding parameters from a pre-designed codebook. Thus, for example, determining the indication comprises determining an indication of a codeword of a plurality of codewords, wherein the precoding parameters comprise the indicated codeword.

In some examples, the precoder codebook can be constructed by optimizing each codeword (precoder) for a given set of values for the indication, which may be for example Hardware State Information (HSI). This may describe for example phase noise power, power amplifier (PA) polynomial coefficients, DAC resolution, and/or any other information relating to the transmission apparatus, particularly if it describes distortion caused by the transmission apparatus or a property of the hardware that may cause distortion.

The indication, e.g. the hardware state information (HSI), can in some examples be estimated at the receiver (e.g. a User Equipment, UE, in a downlink scenario). In some examples, this may be done by inferring the parameter values of a parametrized hardware impairments model (e.g. a model for oscillator phase noise, power amplifier nonlinearities, DAC) from the received signal, or by applying a classification method using pre-trained models. The indication, e.g. HSI, may then be computed using such a model. Alternatively, for example, the indication or HSI can be computed at the transmitter (e.g. the wireless communication device) based on measurements from antenna port(s), e.g. comparing the input signal to the transmission apparatus to the output provided to the antenna port(s). A classification method can then in some examples be used to select a pre-trained model.

In some examples, machine learning techniques can be applied to train models based on a set of measurement signals from the transmission apparatus, subject to different realizations of hardware impairments and the corresponding labels which could be hardware configurations, parameters or the associated HSI index. Next, the model can be used for the classification based on new measurements of the received signal to find the corresponding HSI index. In one example, a convolutional neural network (CNN) can be trained using 'supervised training methods' using measurements of in-phase and quadrature part of the signal at the output of the transmission apparatus and corresponding labels, e.g. one or more of the phase noise power, power amplifier back-off level, DAC resolution, or other property or impairment of the transmission apparatus. The number of classes may in some examples correspond to the number of HSI indices. The trained CNN can be used to associate the corresponding hardware impairment parameters and the HSI indices to each realization of the received signal. In another example, 'unsupervised training method' such as k-means clustering can be applied on the measurements at the receiver, e.g. the in-phase and quadrature signals at the output of the equalizer and cluster the received signals from different hardware conditions into 'k' clusters, where k is the total number of indices and the received samples associated to each clusters are corresponding to the most similar hardware conditions. The model can be trained based on measurements over different hardware, or a hardware subject to different conditions and can be used for identifying the associated HSI based on the received signal.

In a particular example, a precoder codebook can be constructed by optimizing each codeword (precoder or precoding parameters) for a given set of values for the parameterized CSI and HSI (e.g. one or more of phase noise power, PA polynomial coefficients, DAC resolution etc) to improve a performance metric, e.g. signal to distortion and noise ratio (SDNR). Such optimization could also in some examples take into account the hardware architecture, such as a common oscillator for the full set of antenna branches, a sub-set of antenna branches, or a separate oscillator for each antenna branch. Similar architectural considerations could also in some examples be taken depending on the layout of the antenna elements (if e.g. deviating from a uniformly linear spacing), the mix of digital and analog beamforming used across antenna elements and the amplitude and phase stability of such elements. In some examples, a limited set of imperfections (e.g. ones that are common across a product family) can be addressed with a codebook-based approach for precoder parameter selection, and other hardware imperfections, such as those that are individual to a particular device, can be addressed with a non-codebook approach as disclosed later herein to fine tune the precoder parameters. This may also avoid a large codebook size. The table below shows an example of at least part of a codebook:

| | | CSI Index | | | | |
| | | 1 | 2 | 3 | 4 | 5 |
| --- | --- | --- | --- | --- | --- | --- |
| HSI Index | 1 | $W_{1,1}$ | $W_{1,2}$ | $W_{1,3}$ | $W_{1,4}$ | $W_{1,5}$ |
| | 2 | $W_{2,1}$ | $W_{2,2}$ | $W_{2,3}$ | $W_{2,4}$ | $W_{2,5}$ |
| | 3 | $W_{3,1}$ | $W_{3,2}$ | $W_{3,3}$ | $W_{3,4}$ | $W_{3,5}$ |
| | 4 | $W_{4,1}$ | $W_{4,2}$ | $W_{4,3}$ | $W_{4,4}$ | $W_{4,5}$ |
| | 5 | $W_{5,1}$ | $W_{5,2}$ | $W_{5,3}$ | $W_{5,4}$ | $W_{5,5}$ |
| | 6 | $W_{6,1}$ | $W_{6,2}$ | $W_{6,3}$ | $W_{6,4}$ | $W_{6,5}$ |

In this example table, there are a number of precoders (or precoding parameters) for particular index values for HSI and CSI, where for example Wxy indicates precoding parameters for HSI x and CSI y.

In some examples, the precoding parameters may be determined in a non-codebook-based approach, which may be used exclusively or in combination with the above-described codebook-based approach in some examples. For example, precoding parameters can be selected by searching over a parameterized precoder function, the precoder function taking state information (e.g. the indication or HSI, and optionally other information such as CSI) as input and producing a vector of precoding weights. The set of parameters can be optimized in some examples by defining at least one of:

a loss function based on the precoder function output (given the state information) and a target vector of precoding weights.
   optimization criterion based on the precoder output and the state information.
   a reward based on the precoder output and the state information.

The optimization may then be carried out by changing the parameter values typically in an iterative manner taking state information and precoder output as input to a gradient-based optimization algorithm. The parameters can be for example the ones in a parametrized neural network (NN)-based precoder. The reward can in some examples be specified in a reinforcement learning setting as the increase of the ratio of the power of received signal to the intended users over the power of interference towards unintended directions. The optimization criterion can in be for example the signal to interference and noise ration (SINR) or signal to leakage and noise ratio (SLNR) for each user served by the precoder. In some examples, the state information may comprise CSI for one or more users served by the precoder and the HSI as measured at the transmitting node, receiving node, or a combination thereof.

The loss function may be designed in some examples based on one or more performance metrics and performance objectives. The HSI may for example be inferred based on the output signal to the array antenna and the input signal to the RF chain. A model of RF impairment can be trained based on the inputs and outputs of the transmission apparatus. Alternatively, the HSI can be computed at the receiver based on the received signal, for example using a trained classifier or a look up table.

The loss function can in some examples be a function of one or several of the below loss components:

An average of the magnitude of the wanted signal.
   An average of the magnitude of distortions in both spatial and frequency domains.
   A weighted average of the magnitude of distortions in both spatial and frequency domains. The weighting can be performed to achieve a desired output signal e.g. with little distortions in certain spatial directions and/or in certain frequency ranges.
   The magnitude of distortion in spatial and frequency domains where leakage interference needs to be reduced or prohibited, e.g. towards an earth station in an adjacent satellite network operating in adjacent frequency band, or areas or towards primary (licensed) users in cognitive radio networks as discussed below.
   The average magnitude of distortion over specific areas in spatial and frequency domains in a network where User Equipments (UEs) are scheduled in a serving cell or neighboring cells.
   The average magnitude of distortion over specific areas in spatial and frequency domains in a network towards base stations in neighboring cells where the leakage interference needs to be reduced or avoided.

In some examples, the precoding parameters may be selected to meet one or more secondary conditions. For example, a secondary condition may be to keep the out of band emissions of the precoded symbols, when transmitted, within a limit.

Determining the indication may in some examples comprise determining the precoding parameters based on a model of the transmission apparatus, such as for example the parameterized hardware impairments model suggested above. For example, determining the indication may comprise comparing inputs and outputs of the model of the transmission apparatus to estimate the distortion of the transmission apparatus, and wherein the precoding parameters are determined based on the estimate of the distortion of the transmission apparatus. The model itself may be trained for example based on inputs and outputs of the transmission apparatus. Thus for example the model may comprise an approximation or an estimation of the transmission apparatus.

In some examples, the precoder parameters can be selected by searching over a parameterized precoder function, the precoder function taking state information as input (e.g. HSI and optionally other information such as CSI) and producing a vector of precoding weights. The set of parameters can be optimized by, in different embodiments, defining one or more of the following:

a loss function based on the precoder function output (given the state information) and a target vector of precoding weights.
   an optimization criterion based on the precoder output and the state information.
   a reward based on the precoder output and the state information.

The optimization may then in some examples be carried out by changing the parameter values, for example in an iterative manner, taking state information and precoder output as input to a gradient-based optimization algorithm. The HSI can in some examples be inferred based on the output signal of the transmission apparatus the input signal. A model of RF impairment, such as for example the parameterized hardware impairments model described above, can in some examples be trained based on the inputs and outputs of the transmission apparatus. Alternatively, for example, the indication such as HSI can be computed at the receiver based on the received signal, using e.g. a trained classifier or a look up table. Information suitable for allowing the wireless communication device to determine the precoding parameters may then be fed back to the wireless communication device.

In some examples, determining the precoding parameters may comprise determining the precoding parameters based on the indication of distortion or the indication of the correction to improve a performance metric of symbols transmitted from the transmitting apparatus to one or more further wireless communication devices. The performance metric may be for example one or more of signal to noise ratio, SNR, signal to noise and distortion ratio, SNDR, signal to interference and noise ratio, SINR, and signal to leakage and noise ratio, SLNR, although these are merely examples and one or more other performance metrics may additionally or alternatively be used. Thus, in some examples, determining the precoding parameters may comprise determining the performance metric, determining the precoding parameters based on the performance metric, updating the performance metric and updating the precoding parameters based on the updated performance metric.

Figure 2:
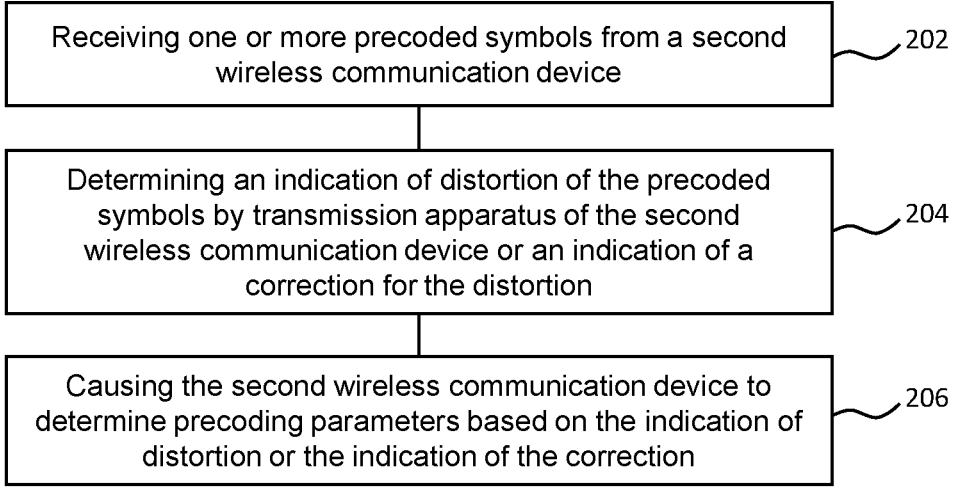
FIG. 2 is a flow chart of an example of a method in a first wireless communication device of determining precoding parameters.

FIG. 2 is a flow chart of an example of a method 200 in a first wireless communication device of determining precoding parameters. The method 200 comprises, in step 202, receiving one or more precoded symbols from a second wireless communication device. In some examples, the second wireless communication device may precode and transmit the precoded symbols in accordance with the method 100 described above.

The method 200 also comprises, in step 204, determining an indication of distortion of the precoded symbols by transmission apparatus of the second wireless communication device or an indication of a correction for the distortion. In some examples, this may be performed using a codebook-based approach or any of the other approaches suggested above, including for example based on a model of the transmission apparatus, and/or to improve a performance metric. For example, as indicated above, the indication (or HSI) may be calculated by inferring the parameter values of a parametrized hardware impairments model (e.g. a model for oscillator phase noise, power amplifier nonlinearities, DAC) from the received signal, or by applying a classification method using pre-trained models. The indication, e.g. HSI, may then be computed using such a model.

As suggested above, the distortion may be for example phase noise, quantization noise and/or nonlinearity of the transmission apparatus.

The method 200 also comprises, in step 206, causing the second wireless communication device to determine precoding parameters based on the indication of distortion or the indication of the correction. This may be done for example by sending the precoding parameters to the second wireless communication device, sending the indication or HSI, and/ or sending any other information that may allow the second wireless communication device to select predistortion parameters to alleviate at least some of the distortion caused by the transmission apparatus in the second wireless communication device.

Embodiments as disclosed herein may be used in certain scenarios. For example, a primary network, e.g. a cellular network, may operate in proximity of a secondary network, e.g. a satellite network, where the secondary network is transmitting signals over frequency bands adjacent to those used by the primary network. In such scenarios, the out of band (OOB) emissions due to RF hardware impairments, such as power amplifier nonlinearities, from the primary network may cause interference to nodes of the secondary network, e.g. an earth station in a satellite communication network. A precoder that uses precoding parameters determined or selected to account for hardware imperfections, such as the transmission apparatus, as disclosed herein can be used in some examples to exploit multiple antennas at the transmitter node of the primary network such that the array gain towards the intended nodes in the primary network (performance metric) become maximized, while the out of band interference due hardware impairment towards a node in the secondary network (e.g. the earth station) can be minimized (secondary objective) and thus limit the interference to below the maximum permitted limit by regulatory bodies.

Alternatively, for example, Cognitive Radio Networks (CRNs) may be used as a solution to increase spectrum utilization by sharing the spectrum between licensed and unlicensed users. In these networks, unlicensed users may be allowed to access licensed spectrum, under the condition that the interference perceived by the licensed users is minimal.

However, transmissions by an unlicensed user may create interference to the licensed users due to the signal leakage towards unintended directions because of hardware impairments. Thus, a precoder that uses precoding parameters determined or selected to account for hardware imperfections, such as the transmission apparatus, as disclosed herein can be used in some examples by unlicensed users to maximize the array gain (performance metric) for communication towards the intended receiver while null-forming towards the licensed users so that the leaked interference towards the licensed users remains below a certain threshold (secondary objective).

In an example radio network, users are not distributed uniformly in the coverage area. Instead, some directions (as seen from the base station antenna array) are much more common for users or their devices, while other directions are not so common. For example, users tend to be located close to the horizon and such knowledge can be utilized by a base station with an antenna array that supports vertical beam steering. In some examples of this disclosure, therefore, signal distortions due to hardware impairments could be beamformed in a direction such as zenith where there are no users to be hit by the interference.

Figure 3:
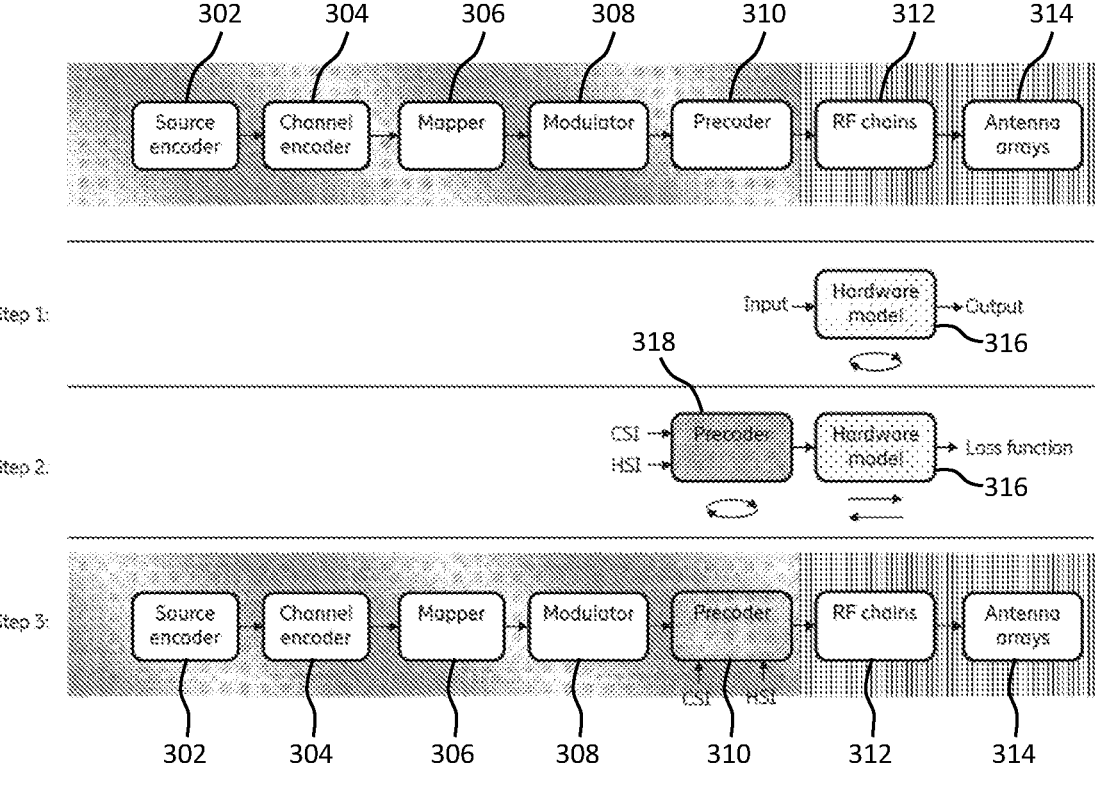
FIG. 3 shows an example of a supervised learning approach for determining precoding parameters.

As mentioned above, machine learning techniques may be used, for example to select a precoder or precoding parameters. One example is illustrated in FIG. 3, which shows an example of a supervised learning approach for determining precoding parameters. As shown in FIG. 3, in a transmitter, source encoder 302 provides an output to channel encoder 304, which provides an output to mapper 306. Mapper 306 provides an output to modulator 308 which provides an output to precoder 310. In this example, source encoder 302 removes unnecessary redundancies from the information bit to reduce the required bandwidth for the information transmission. Channel encoder 304 adds specific redundancies to the transmitted bits to be used by the receiver for the purpose of error detection and error correction of errors that may be introduced by the communication channel and noise. Mapper 306 maps the information bits from channel encoder 304 to symbols, where each symbol is represented for example by one of the points in a two-dimensional constellation diagram. Modulator 308 maps the transmit symbols from mapper 306 to waveforms.

The precoded symbols from the precoder 310 are provided to RF chains 312 and then to antenna arrays 314 from which they are transmitted. The transmission apparatus referred to above may in some examples comprise the RF chains 312 and/or antenna arrays 314. In some examples, the components 302-310 are in the digital domain, whereas components 312 and 314 are in the analog domain.

In this example, the selection of the precoder is based on machine learning/artificial intelligence in the transmitter where, in a first step, a "hardware model" 316 (e.g. a neural network) is trained on inputs and outputs of the hardware parts the model should adapt to (e.g. the RF chains 312 and/or the antenna arrays 314). After training is finished, such model can be considered to mimic the hardware (to a close enough degree) for any given input and providing sufficiently representative output to train a second model. In the second step of training, the first model is kept fixed while a second model, a "precoder" 310 is trained so as to determine precoding parameters. Such training is performed by putting the two models in sequence (precoder 318 followed by hardware model 316 as shown) and associating a loss function to the output of the hardware model. The input to the precoder 310 includes the state of the channel (CSI) and the state of the hardware impairments (HSI). When training is done, the trained precoder can be used in step 3, where the precoder 310 may for example precode symbols to be transmitted in accordance with step 106 of the method 100 shown in FIG. 1.

In some examples, the hardware model 316 and the precoder 310 may be trained simultaneously (i.e. step 1 and 2 above are merged) to minimize the loss function. In some examples, the hardware model consists of a traditional model and a neural network, and where the output of the two models are summed together. In this way the neural network acts as a correction term to the traditional hardware model. This arrangement may reduce the dynamic range of the neural network output smaller thereby reduce the requirements on the neural network.

Figure 4:
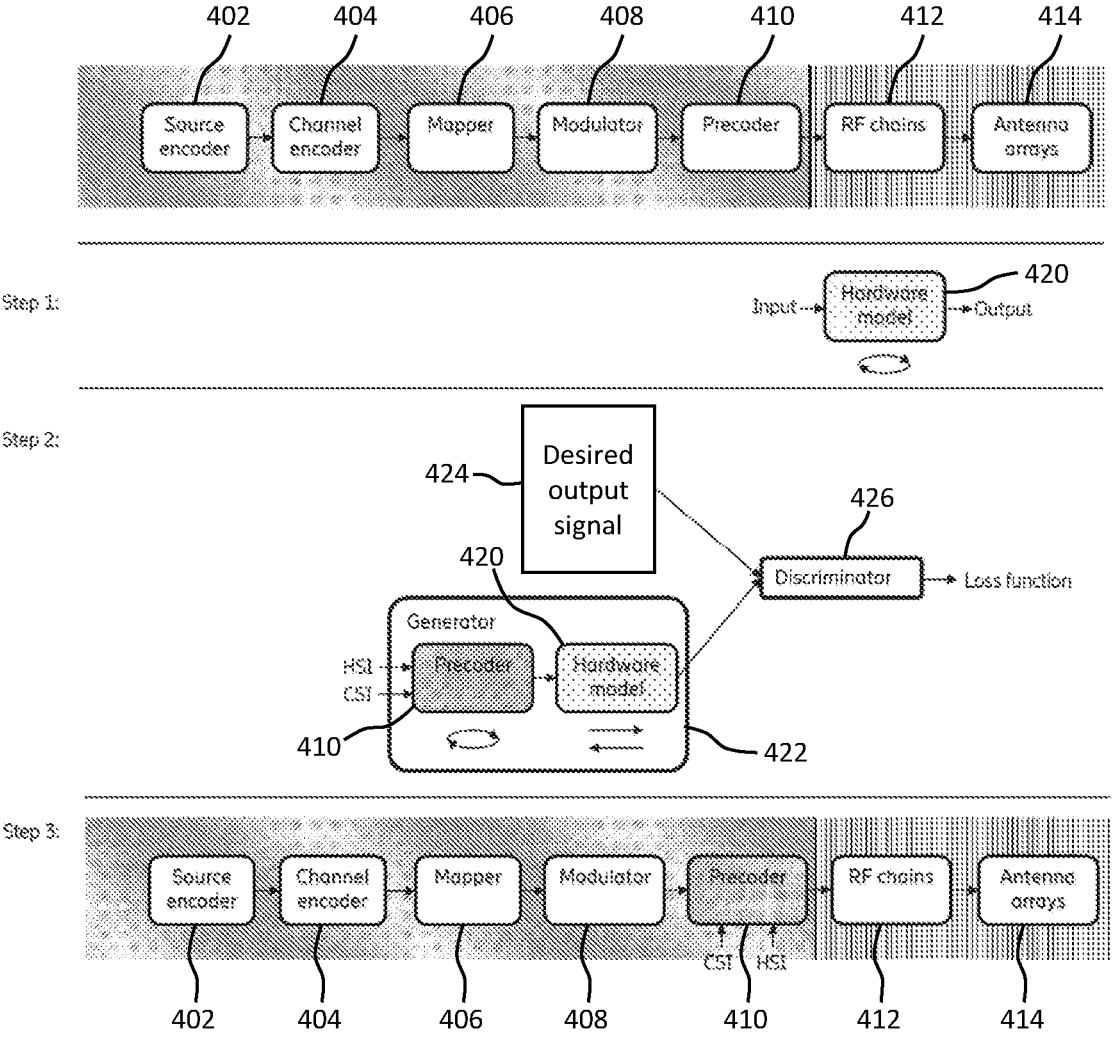
FIG. 4 shows an example of a supervised learning approach using C-GAN for determining precoding parameters.

Another example is shown in FIG. 4, which shows an example of a supervised learning approach using C-GAN for determining precoding parameters. As shown in FIG. 4, in a transmitter, source encoder 402 provides an output to channel encoder 404, which provides an output to mapper 406. Mapper 406 provides an output to modulator 408 which provides an output to precoder 410. These components may in some examples be similar to the corresponding components 302, 304, 306 and 308 described above. The precoded symbols from the precoder 410 are provided to RF chains 412 and then to antenna arrays 414 from which they are transmitted. The transmission apparatus referred to above may in some examples comprise the RF chains 412 and/or antenna arrays 414. In some examples, the components 402-410 are in the digital domain, whereas components 412 and 414 are in the analog domain.

In the example shown in FIG. 4, determining precoding parameters may be similar to FIG. 3, but instead of defining an explicit loss function relating to the wanted output of the precoder and hardware model, a conditional generative adversarial network (C-GAN) is used. In such a scenario, the CSI and HSI is the conditioning information to the generator and the discriminator is trained on data using e.g. the wanted precoded signal without distortions.

In step 1 in FIG. 4, an estimate of a RF hardware (transmission apparatus) model 420 is obtained. The model can in some examples be a model of the actual RF hardware, so that if the same input is provided to the RF hardware and the model 420, similar output is generated by both. The input and output of the RF hardware can be used as training samples for training of a machine learning model for the hardware model 420, e.g. a neural network using supervised learning methods.

In step 2 of FIG. 4, a generator 422 consists of a precoder 410 that generates example precoded inputs to the RF hardware model 420. The output of the generator 422 resembles the output of the actual transmission apparatus for the given precoder 410. The output of the generator 422 is compared with desired output signal 424 (e.g. based on the input to the transmission apparatus or the precoder 410 in the generator 422) using a discriminator 426.

The output of the discriminator 426 is provided to a loss function that quantifies the difference between the output of the generator 422 and the desired output signal 424. The loss function can be used for example to modify the precoder 410 parameters such that the loss (e.g. the output of the loss function) is reduced or minimized. This process can in some examples be repeated to reduce or minimize the loss function in an iterative manner, e.g. for the same and/or different inputs to the precoder 410 in the generator 422.

In step 3 of FIG. 4, the precoder 410 for which parameters were determined in step 2 is used for precoding symbols (e.g. from the modulator 408) for transmission using the transmission apparatus.

Figure 5:
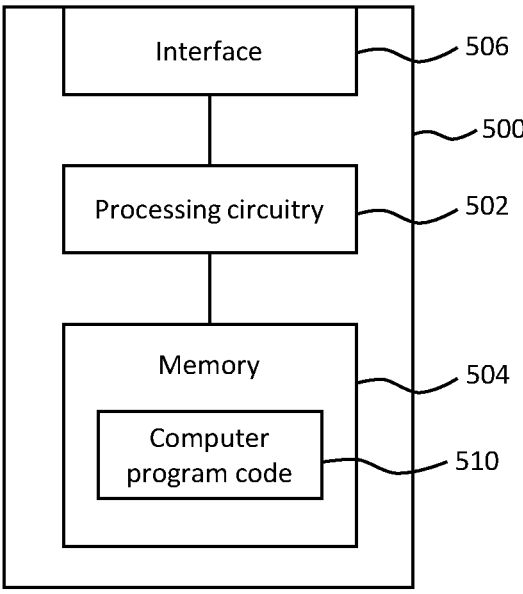
FIG. 5 is a schematic of an example of an apparatus in a wireless communication device for precoding symbols for transmission.

FIG. 5 is a schematic of an example of an apparatus 500 in a wireless communication device for precoding symbols for transmission. The apparatus 500 comprises processing circuitry 502 (e.g. one or more processors) and a memory 504 in communication with the processing circuitry 502. The memory 504 contains instructions, such as computer program code 510, executable by the processing circuitry 502. The apparatus 500 also comprises an interface 506 in communication with the processing circuitry 502. Although the interface 506, processing circuitry 502 and memory 504 are shown connected in series, these may alternatively be interconnected in any other way, for example via a bus.

In one embodiment, the memory 504 contains instructions executable by the processing circuitry 502 such that the apparatus 500 is operable/configured to determine an indication of distortion of symbols transmitted by transmission apparatus of the wireless communication device or an indication of a correction for the distortion, determine precoding parameters based on the indication of distortion or the indication of the correction, and precode symbols to be transmitted based on the precoding parameters. In some examples, the apparatus 500 is operable/configured to carry out the method 100 described above with reference to FIG. 1.

Figure 6:
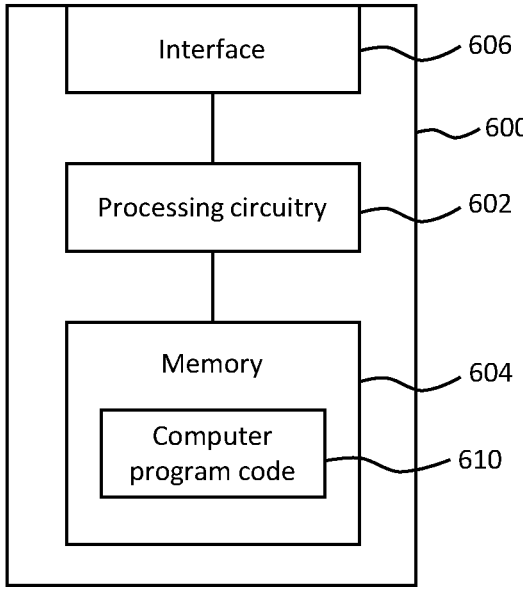
FIG. 6 is a schematic of an example of an apparatus for determining precoding parameters.

FIG. 6 is a schematic of an example of an apparatus 600 for determining precoding parameters. The apparatus 600 comprises processing circuitry 602 (e.g. one or more processors) and a memory 604 in communication with the processing circuitry 602. The memory 604 contains instructions, such as computer program code 610, executable by the processing circuitry 602. The apparatus 600 also comprises an interface 606 in communication with the processing circuitry 602. Although the interface 606, processing circuitry 602 and memory 604 are shown connected in series, these may alternatively be interconnected in any other way, for example via a bus.

In one embodiment, the memory 604 contains instructions executable by the processing circuitry 602 such that the apparatus 600 is operable/configured to receive one or more precoded symbols from a second wireless communication device, determine an indication of distortion of the precoded symbols by transmission apparatus of the second wireless communication device or an indication of a correction for the distortion, and cause the second wireless communication device to determine precoding parameters based on the indication of distortion or the indication of the correction. In some examples, the apparatus 600 is operable/configured to carry out the method 200 described above with reference to FIG. 2.

Figure 7:
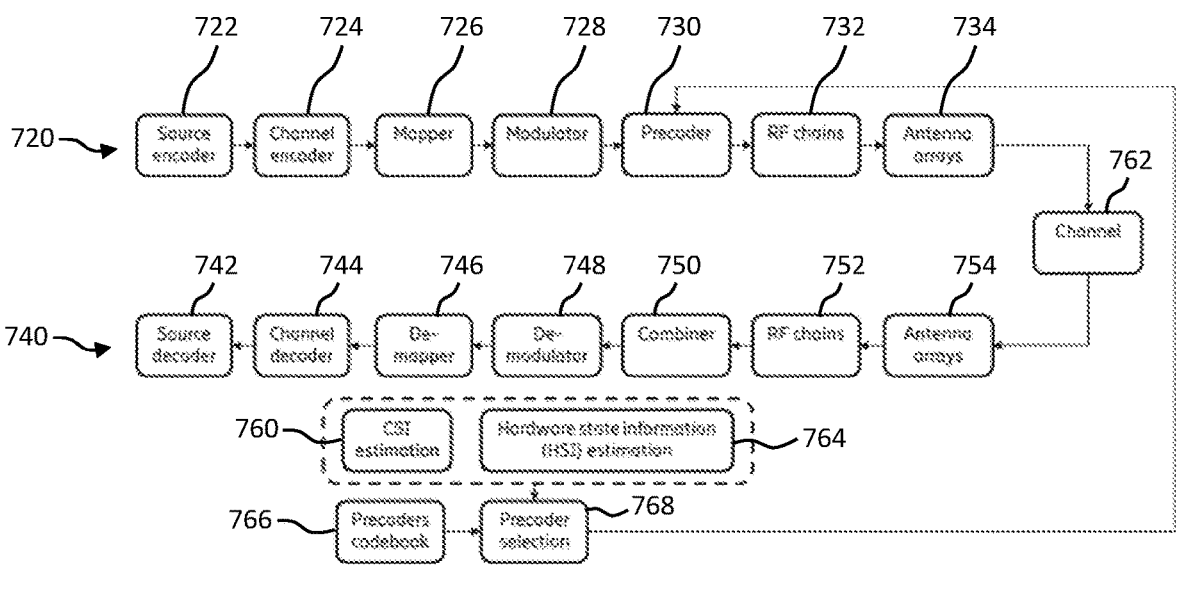
FIG. 7 shows an example of a system including a transmitting device and receiving device 740 according to an example of this disclosure.

FIG. 7 shows an example of a system 700 including a transmitting device 720 and receiving device 740 according to an example of this disclosure. The transmitting device 720 includes source encoder 722, channel encoder 724, mapper 726, modulator 728, precoder 730, RF chains 732 and antenna arrays 734. In some examples, these components 722-734 are similar to components 302-314 shown in FIG. 3 and/or components 402-414 shown in FIG. 4. The receiver 740 includes source decoder 742, channel decoder 744, demapper 746, demodulator 748, combiner 750, RF chains 752 and antenna arrays 754. A signal transmitted by transmitter 720 may be transmitted via a channel 762 to the receiver 740.

The system 700 shows an example implementation of a codebook-based approach as described above. In the system 700, channel state information (CSI) 760 is determined at the receiver 740 (e.g. using a reference signal from the transmitter 720 via a channel 762 and applying channel estimation at the receiver). In addition, the hardware state information (HSI) 764 is determined at the receiver 740 (e.g. by applying a classification method on the received signal to determine how much the signal is distorted). The HSI 764 and CSI 760 are used by the receiver 740 to determine the index of the precoder in a precoder codebook 766 using precoder selection 768, for example using a codebook based approach as described above. Next, the index of the precoder is sent to the transmitter 720 (e.g. via channel 762), where for example the transmitter 720 may use the index to retrieve precoding parameters for the precoder 730 from the codebook, which may be locally stored at the transmitter 720.

Figure 8:
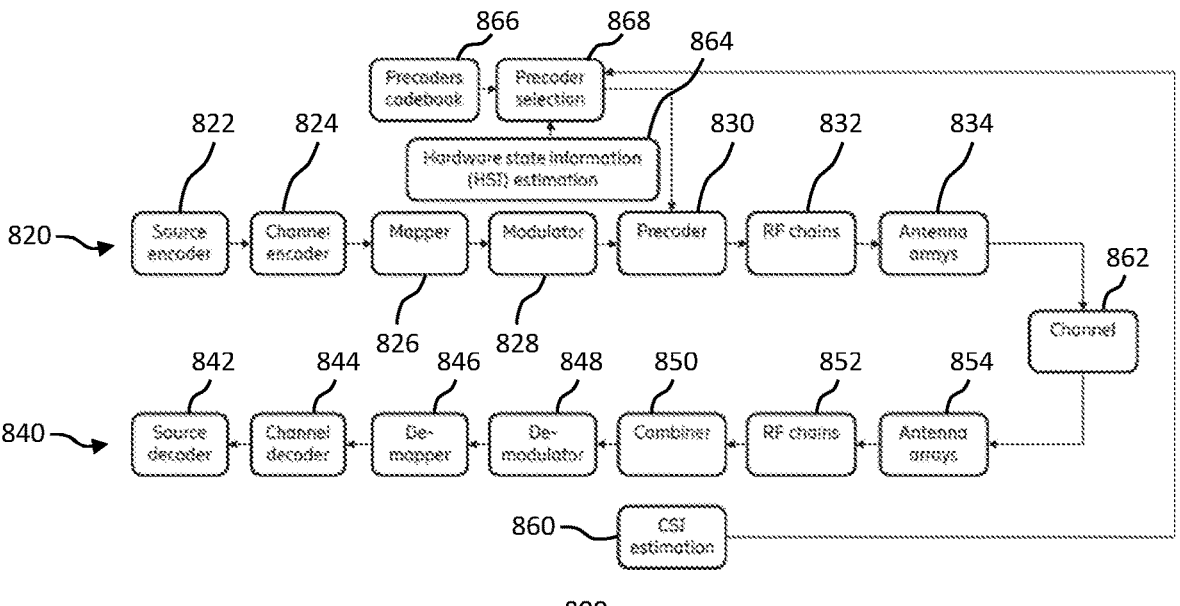
FIG. 8 shows another example of a system including a transmitting device and receiving device according to an example of this disclosure.

FIG. 8 shows another example of a system 800 including a transmitting device 820 and receiving device 840 according to an example of this disclosure. The transmitting device 820 includes source encoder 822, channel encoder 824, mapper 826, modulator 828, precoder 830, RF chains 832 and antenna arrays 834. In some examples, these components 822-834 are similar to components 302-314 shown in FIG. 3, and/or components 402-414 shown in FIG. 4, and/or components 722-734 shown in FIG. 7. The receiver 840 includes source decoder 842, channel decoder 844, demapper 846, demodulator 848, combiner 850, RF chains 852 and antenna arrays 854. A signal transmitted by transmitter 820 may be transmitted via a channel 862 to the receiver 840.

The system 800 shows an example implementation of a codebook-based approach as described above. In the system 800, channel state information (CSI) 860 is determined at the receiver 840 (e.g. using a reference signal from the transmitter 820 via a channel 862 and applying channel estimation at the receiver). In addition, the hardware state information (HIS) 864 is determined at the transmitter 820. This may be done in some examples using any of the examples described herein, for example based on the configurations of the hardware such as how much the power amplifier is in the nonlinear region and oscillator phase noise level, based on measurements of the signal provided to the antenna array 834, or based on a comparison of inputs and outputs of the RF chains 832.

The CSI 860 is fed back from the receiver 840 to the transmitter 820 (e.g. via channel 862), and the HSI 864 and CSI 860 are used by the transmitter 820 to determine the index of the precoder in a precoder codebook 866 using precoder selection 868, for example using a codebook based approach as described above. The transmitter 820 may then use the index to retrieve precoding parameters for the precoder 830 from the codebook 866, which may be locally stored at the transmitter 820.

Figure 9:
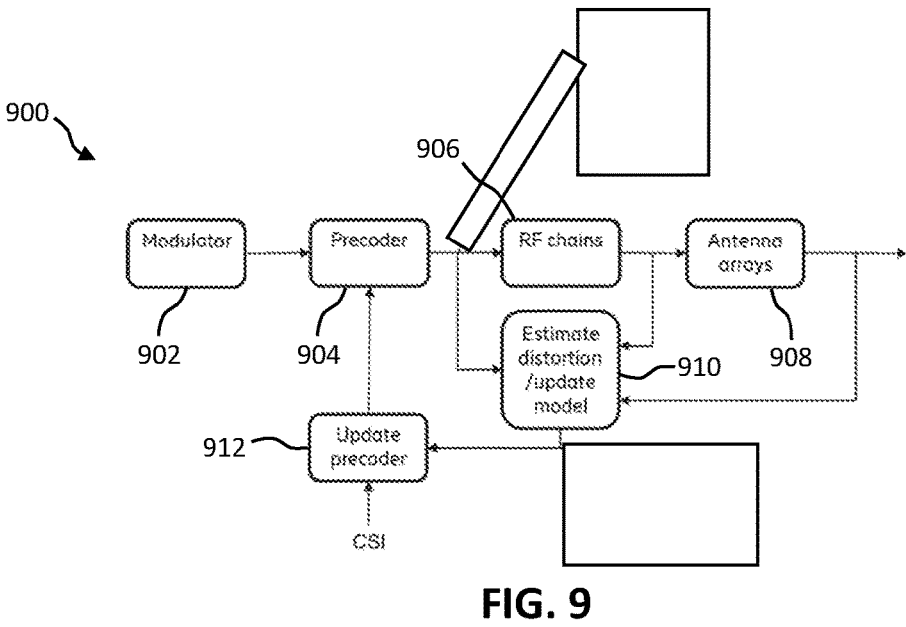
FIG. 9 shows an example implementation of a non-codebook based approach according to this disclosure.

FIG. 9 shows an example implementation of a non-codebook based approach according to this disclosure, such as for example a non-codebook based approach as described above. In the example implementation, a transmitter 900 includes a modulator 902, precoder 904, RF chains 906 and antenna arrays 908. These may in some examples be similar in at least some aspects to corresponding components shown in FIGS. 3, 4, 7 and/or 8. In this example, the input and output signals to/from the RF chains 906 at the transmitter 900 are provided to an estimate block 910 to estimate the distortion caused by the RF chains 906 (e.g. the transmission apparatus) and this may be used to estimate or update a model of RF chains 906 including any hardware impairments. The model is used to determine HSI (or otherwise an indication of distortion). The HSI and the CSI, which may for example be estimated at the transmitter 900 or at a receiver, are used in update block 912 to compute the precoder parameters, e.g. by optimizing precoder parameters to minimize a loss function as described above. The result may be for example to reduce the distortion towards non-intended directions, e.g. to minimize unintended emissions towards a satellite station.

Figure 10:
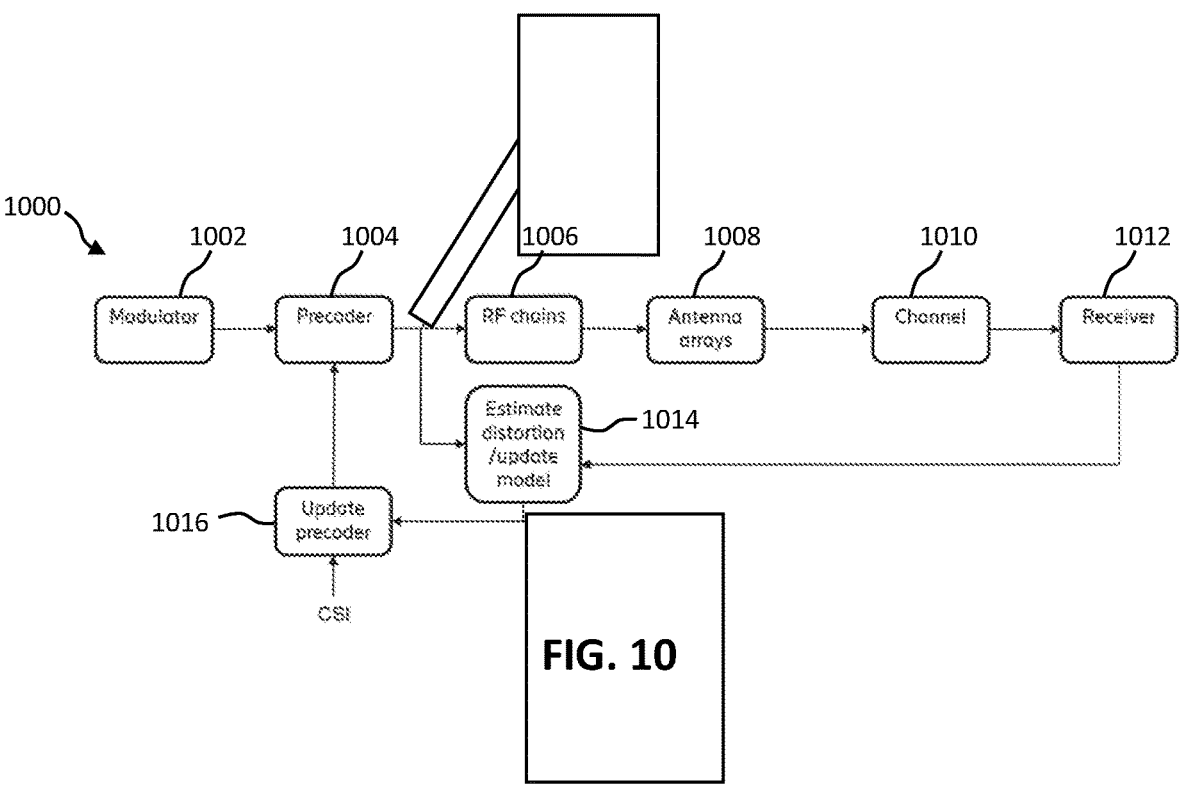
FIG. 10 shows another example implementation of a non-codebook based approach according to this disclosure.

FIG. 10 shows another example implementation of a non-codebook based approach according to this disclosure. In this example, a feedback from receiver is used for estimation of the hardware model. In this example, a transmitter 1000 includes modulator 1002, precoder 1004, RF chains 1006 (e.g. transmission apparatus) and antenna arrays 1008. These may in some examples be similar in at least some aspects to corresponding components shown in FIGS. 3, 4, 7, 8 and/or 9. The transmitter 1000 may transmit a signal via a channel 1010 to a receiver 1012. The receiver 1012 may feed back to the transmitter 1000 a measured property of a received signal received from the transmitter 1000 or a function of it, for example an index which is computed based on a classifier of the received signal. This may be used by transmitter 1000 in estimate block 1014 estimate or update a model of RF chains 1006 including any hardware impairments. The model is used to determine HSI (or otherwise an indication of distortion). The HSI and the CSI, which may for example be estimated at the transmitter 1000 or at the receiver 1012, are used in update block 1016 to compute the precoder parameters, e.g. by optimizing precoder parameters to minimize a loss function as described above. The result may be for example to reduce the distortion towards non-intended directions, e.g. to minimize unintended emissions towards a satellite station.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method in a wireless communication device of precoding symbols for transmission, the method comprising:

determining an indication of distortion of symbols transmitted by transmission apparatus of the wireless communication device or an indication of a correction for the distortion;

determining precoding parameters based on the indication of distortion or the indication of the correction; and precoding symbols to be transmitted based on the precoding parameters.

2. The method of claim 1, wherein determining the indication comprises determining the indication based on feedback relating to transmission of other symbols by the transmission apparatus.

3. The method of claim 2, comprising receiving the feedback from one or more receivers of the other symbols.

4. The method of claim 2, comprising determining the feedback based on a comparison of an input and an output of the transmission apparatus when transmitting the other symbols.

5. The method of claim 1, comprising receiving the indication from one or more receivers of other symbols transmitted by the transmission apparatus.

6. The method of claim 1, wherein determining the indication comprises determining an indication of a codeword of a plurality of codewords, wherein the precoding parameters comprise the indicated codeword.

7. The method of claim 1, wherein determining the indication comprises:

determining the precoding parameters based on a model of the transmission apparatus, and comparing inputs and outputs of the model of the transmission apparatus to estimate the distortion of the transmission apparatus, wherein the precoding parameters are determined based on the estimate of the distortion of the transmission apparatus.

8. The method of claim 7, comprising training the model of the transmission apparatus based on inputs and outputs of the transmission apparatus.

9. The method of claim 1, wherein determining the precoding parameters comprises: determining the precoding parameters based on the indication of distortion or the indication of the correction to improve a performance metric of symbols transmitted from the transmitting apparatus to one or more further wireless communication devices, and determining the performance metric, determining the precoding parameters based on the performance metric, updating the performance metric and updating the precoding parameters based on the updated performance metric.

10. The method of claim 9, wherein the performance metric comprises one or more of signal to noise ratio (SNR), signal to noise and distortion ratio (SNDR), signal to interference and noise ratio (SINR), and signal to leakage and noise ratio (SLNR).

11. The method of claim 1, wherein determining the indication comprises updating a previous indication of distortion or a previous indication of a correction for the distortion.

12. The method of claim 1, wherein determining the precoding parameters comprises updating previous precoding parameters.

13. The method of claim 1, comprising determining the precoding parameters based further on channel state information (CSI) of at least one channel on which the precoded symbols are to be transmitted, and/or based further on a signal to noise ratio (SNR) of signals transmitted from the transmission apparatus.

14. The method of claim 1, comprising providing the precoded symbols to the transmission apparatus for transmission.

15. The method of claim 1, wherein the transmission apparatus comprises one or more radio frequency (RF) transmitter chains.

16. The method of claim 1, wherein the distortion comprises at least one of phase noise, quantization noise and nonlinearity of the transmission apparatus.

17. The method of claim 1, comprising determining the precoding parameters based further on channel state information (CSI) of at least one channel on which the precoded symbols are received, and/or based further on a signal to noise ratio (SNR) of signals transmitted from the second wireless communication device.

18. A method in a first wireless communication device of determining precoding parameters, the method comprising:

receiving one or more precoded symbols from a second wireless communication device;

determining an indication of distortion of the precoded symbols by transmission apparatus of the second wireless communication device or an indication of a correction for the distortion; and causing the second wireless communication device to determine precoding parameters based on the indication of distortion or the indication of the correction.

19. The method of claim 18, wherein determining the indication comprises determining an indication of a codeword of a plurality of codewords, wherein the precoding parameters comprise the indicated codeword, and wherein causing the second wireless communication device to determine the precoding parameters comprises sending the indication to the second wireless communication device.

20. An apparatus in a wireless communication device for precoding symbols for transmission, the apparatus comprising a processor and a memory, the memory containing instructions executable by the processor such that the apparatus is operable to:

determine an indication of distortion of symbols transmitted by transmission apparatus of the wireless communication device or an indication of a correction for the distortion;

determine precoding parameters based on the indication of distortion or the indication of the correction; and precode symbols to be transmitted based on the precoding parameters.

* * * * *